A. R. LAKIN.
OUTLET BOX.
APPLICATION FILED JAN. 14, 1914.

1,206,549.   Patented Nov. 28, 1916.

Witnesses
G. F. Baker.
G. Ferd. Vogt.

Inventor
Allan R. Lakin
By
Mann & Co.
Attorneys.

UNITED STATES PATENT OFFICE.

ALLAN R. LAKIN, OF NEW YORK, N. Y.

OUTLET-BOX.

1,206,549.　　　　　Specification of Letters Patent.　　Patented Nov. 28, 1916.

Application filed January 14, 1914.　Serial No. 811,934.

*To all whom it may concern:*

Be it known that I, ALLAN R. LAKIN, a citizen of the United States, residing at New York city, in the county of New York and State of New York, have invented certain new and useful Improvements in Outlet-Boxes, of which the following is a specification.

This invention relates to an improved construction of outlet boxes for electric wiring and has for its object to provide an improved means for effecting an adjustment of the outer exposed plates or the nozzle carrying parts, if a nozzle is employed, of the box, independently of the box proper, whereby exposed plates or parts may be made to aline or become parallel with the outer surface of the floor, ceiling or wall in which the box is embedded.

Outlet boxes are usually placed in position before the wall, floor or ceiling surface is completed, and while they may be originally placed with care, they become displaced by being knocked, or by reason of the fact that the outer surfacing of the wall is not accurately spread or applied, with the result that the exposed plates or nozzle-carrying parts of the box do not aline with such outer surface. The present invention therefore provides a novel construction whereby the exposed parts may be adjusted independently of the box so as to bring said parts into alinement with the outer surfacing of the floor, ceiling or wall.

The invention is illustrated in the accompanying drawing wherein,—

Figure 1:
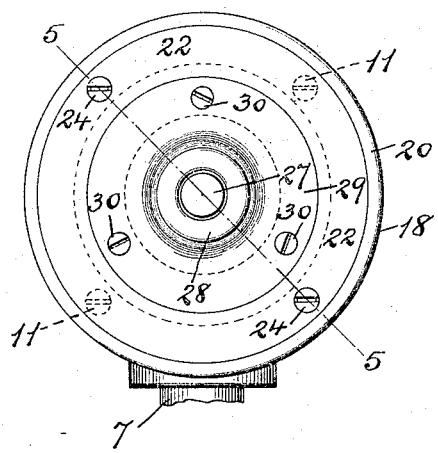
Figure 2:
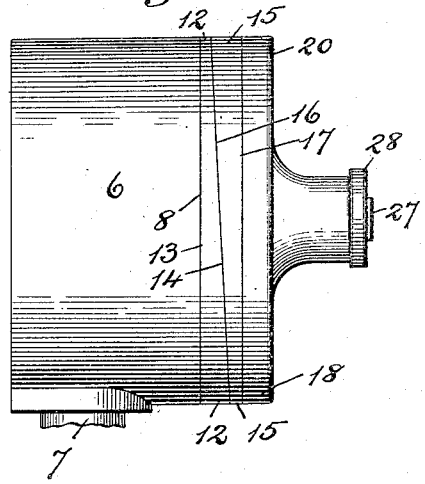
Figure 3:
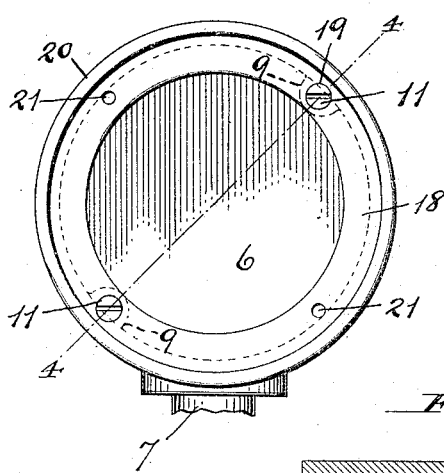
Figure 4:
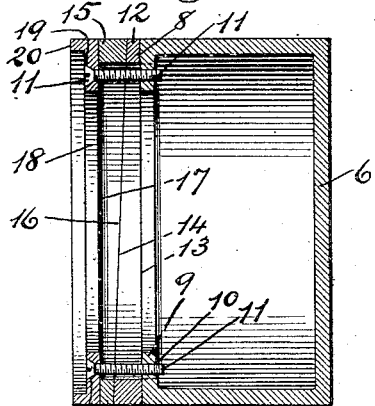
Figure 5:
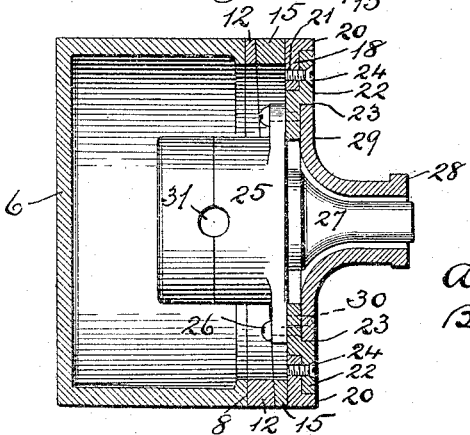

Figure 1 shows a front view of a box having my improved construction and with the exposed plates or nozzle-carrying parts thereon. Fig. 2 illustrates the same in side elevation. Fig. 3 shows a front view of the box with the nozzle-plate and nozzles removed. Fig. 4 is a cross-sectional detail through the structure shown in Fig. 3,—the section being taken on the line 4—4 of Fig. 3, and Fig. 5 shows a cross-section through the box with the exposed ring-plate, nozzle-plate and nozzles in position,—the section being taken on the line 5—5 of Fig. 1.

Referring to the drawing the numeral, 6, indicates the box proper, having one or more conduits, 7, entering the side thereof through which the wires are led into the box in the usual manner.

The box proper may be of any desired exterior shape but in the present instance it is of circular form and has a circular rim edge, 8, on the interior of which at diametrically opposite sides are semi-circular eyes, 9, shown in broken lines in Fig. 3. These eyes, 9, have screw-threaded perforations, 10, for the reception of the inner ends of adjusting screws, 11, which will presently be more fully explained.

An adjusting ring, 12, has an inner face, 13, of any desired shape in cross-section which seats against the circular rim-edge, 8, of the box and said adjusting ring also has an outer face, 14, which is beveled or inclined circumferentially. It is therefore to be understood that the adjusting ring, 12, is thicker at one side than at the diametrically-opposite side and that one face of it bevels and becomes gradually thinner in a circumferential direction from the thicker to the thinner side. A second adjusting ring, 15, has position at the outer side of the adjusting ring, 12, and said second ring is provided with a circumferentially beveled or inclined inner face, 16, which bears against the beveled face, 14, of the ring, 12. The outer face, 17, of the second adjusting ring, 15, is preferably flat circumferentially.

It is therefore to be understood that two adjusting rings, 12, and, 15, are employed, and that one ring has a beveled inner face, 16, that contacts with a beveled outer face, 14, of the other ring. When the two beveled rings have the particular position relative to each that is shown in the drawing, the thinnest portion of one ring being against the thickest portion of the other ring, the two flat faces, 13, and, 17, of the rings will be parallel, but when one ring is rotated with respect to the other, the two flat faces will assume a relatively inclined position,—the inclination increasing as the two thickest portions of the two rings approach each other by the rotation of one ring with respect to the other.

A ring plate, 18, is seated against the outer flat face, 17, of the adjusting ring, 15, and said ring plate is provided with countersunk perforations, 19, to receive the heads of the adjusting screws, 11, and also has an annular rim-flange, 20, which forms a circular socket on the outer side of the said ring plate. This ring plate also has screw-threaded perforations, 21, to receive screws 24, presently to be described. The ring-plate, 18, receives a ring-shaped nozzle-plate, 22, which latter seats in the socket formed by said rim-flange 20, and is flush with the rim-flange, 20, of the ring-plate. This nozzle-plate has an inner rim-edge recess, 23, and is also provided, preferably at diametrically opposite sides, with perforations through which retaining screws, 24, pass and screw into the threaded perforations, 21, of the ring plate, 18.

A receptacle, 25, of porcelain, or other suitable material has side flanges and is carried at the under side of the nozzle-plate, 22,—screws, 26, being employed through said flanges to rigidly secure the receptacle pendantly to the nozzle-plate, and a nozzle, 27, extends from the receptacle outwardly.

A metallic nozzle, 28, has a circular annular base 29, which fits the rim-edge recess, 23, of the nozzle plate and is attached to the latter by means of screws, 30. This metallic nozzle surrounds the porcelain nozzle 27, and protects it.

The purpose of the invention is to effect an adjustment of the ring plate, 18, nozzle-plate, 22, and nozzles, 27, and, 28, with respect to the box, 6, and to enable an adjustment to be made that requires one diametric side of said parts to be moved more or less outward or inward while the diametrically opposite side of the same parts will be moved in a reverse direction with respect to the box and thereby aline the adjustable parts with the floor, ceiling or wall as desired.

By referring to Fig. 4, of the drawing it will be noted that in the present instance the adjusting screws, 11, extend through the ring plate, 18, and pass through the open central space of both adjusting rings, 12, and, 15, and screw into the eyes, 9, on the circular rim edge of the box. If, therefore the screws, 11, are loosened and either ring, 15, or ring, 12, alone is rotated, the ring plate, 18, nozzle-plate, 22, and nozzles will incline outwardly as the thicker part of the rotating ring changes its position with respect to the other adjusting ring which is being held against rotation. In this way the mere rotation of a ring will effect the adjustment and when the proper adjustment has been made the screws, 11, will be screwed tight and lock the parts in the adjusted position.

The porcelain receptacle, 25, of the interior of the box has openings, 31, through which the wires may be passed and extended out through the nozzle, 27.

From the foregoing explanation it will be seen that by simply rotating one circumferential beveled faced part with respect to a coacting beveled faced part the adjustment of the exposed parts, which in this instance are the ring plate, nozzle-plate and nozzles will be readily effected.

Having thus described my invention what I claim and desire to secure by Letters Patent is:—

An outlet device for electric wires having in combination a box with a flat circular face with openings therein to receive fastening devices, of two circular rings having their outer circumferences flush and each ring having a flat face and a circular beveled face at one side, the beveled face sides of the rings being in contact and the flat face of the inner ring being seated against the flat circular face of the box at the outer side of the openings for the fastening devices; a ring-plate having an inner diameter less than the inner diameter of said two rings whereby to project laterally over the openings of both rings, said ring-plate having a flat face that seats against the flat face of the outer ring and said flat face of the ring plate having openings in alinement with the openings in the flat face of the box, and threaded fastenings extending through the openings in the box face and the ring plate face and passing freely through the openings of both rings whereby upon loosening said fastenings one ring may be rotated with respect to the other to tilt the outer ring plate with respect to the flat face of the box mouth.

In testimony whereof I affix my signature in presence of two witnesses.

ALLAN R. LAKIN.

Witnesses:
 OSCAR NELSON,
 WILLIAM J. CAMPBELL.

Copies of this patent may be obtained for five cents each, by addressing the "Commissioner of Patents, Washington, D. C."